United States Patent
Pellerin et al.

(10) Patent No.: US 7,353,701 B2
(45) Date of Patent: Apr. 8, 2008

(54) ASSEMBLY LINE FOR MOUNTED UNITS

(75) Inventors: Dan Pellerin, Howell, MI (US); Boris R. Teper, Farmington Hills, MI (US); Brian Hoy, Brighton, MI (US)

(73) Assignee: Schenck Rotec Corporation, Orion, MI (US)

( * ) Notice: Subject to any disclaimer, the term of this patent is extended or adjusted under 35 U.S.C. 154(b) by 0 days.

(21) Appl. No.: 10/593,921

(22) PCT Filed: Feb. 6, 2004

(86) PCT No.: PCT/US2004/003510

§ 371 (c)(1), (2), (4) Date: Feb. 12, 2007

(87) PCT Pub. No.: WO2004/071791

PCT Pub. Date: Aug. 26, 2004

(65) Prior Publication Data

US 2007/0157460 A1 Jul. 12, 2007

Related U.S. Application Data

(60) Provisional application No. 60/445,986, filed on Feb. 7, 2003.

(51) Int. Cl.
*G01M 17/02* (2006.01)

(52) U.S. Cl. ............................ 73/146; 29/802; 157/1.1
(58) Field of Classification Search .................. 73/146; 29/802; 157/1.1
See application file for complete search history.

(56) References Cited

U.S. PATENT DOCUMENTS

| | | | | |
|---|---|---|---|---|
| 4,886,101 A | * | 12/1989 | Kinnick et al. | 157/1.22 |
| 4,947,919 A | * | 8/1990 | Timlin | 157/1.24 |
| 5,616,859 A | * | 4/1997 | Rhyne | 73/146 |
| 6,082,191 A | * | 7/2000 | Neiferd et al. | 73/146 |
| 6,176,288 B1 | * | 1/2001 | Kane et al. | 157/1 |
| 6,199,270 B1 | * | 3/2001 | Menard et al. | 29/711 |
| 6,298,281 B1 | * | 10/2001 | Menard et al. | 700/228 |
| 6,422,097 B1 | * | 7/2002 | Menard et al. | 73/865.8 |
| 7,082,677 B2 | * | 8/2006 | Pellerin et al. | 29/802 |

* cited by examiner

*Primary Examiner*—Andre J Allen
(74) *Attorney, Agent, or Firm*—Howard & Howard Attorneys, P.C.

(57) ABSTRACT

A tire assembly line including a wheel soaping work station, a tire soaping workstation, a tire and wheel assembly station, and a tire inflation station. The assembly line is formed from a plurality of modules that are interchangeable and releasably connected to one another. The modules support an endless conveyor member for circling movement. The endless conveyor member moves wheels and assembled tires and wheels along the assembly line between the work stations 14 Claims, 4 Drawing Sheets

ASSEMBLY LINE FOR MOUNTED UNITS

RELATED APPLICATIONS

This application is a divisional application of the non provisional application Ser. No. 10/773,028, filed on Feb. 5, 2005 that claims the benefit of U.S. Provisional Patent Application Ser. No. 60/445,986 for an ASSEMBLY LINE FOR MOUNTED UNITS, filed on Feb. 7, 2003, which is hereby incorporated by reference in its entirety.

FIELD OF THE INVENTION

The invention provides an assembly line for assembling tires and wheels with respect to one another.

BACKGROUND OF THE INVENTION

Numerous assembly lines for mounting tires on their mounting wheels and other assembly lines for mounted units are known in the prior art and are widely used today in the automotive industry. Generally, the assembly lines, known in the art, contain conveying means, such as conveyor belts or metal rollers making it possible to route the tires, wheels and mounted assemblies, respectively, from one point to another on the assembly line. The tires and wheels are delivered from a supply warehouse by means of suitable pallets to be further mounted on the assembly line and delivered to customers. On the assembly line, the seats of each wheel rim are lubricated, the wheels are centered, and the beads of the tire are lubricated to facilitate the mounting of the tire on the wheel rim, upon completion of which the tire is inflated and checked for air pressure level to meet the requirements of an automotive industry.

Various prior art patents, such as U.S. Pat. No. 6,199,270 to Menard et al., U.S. Pat. No. 6,298,281 to Menard et al., U.S. Pat. No. 6,422,097 to Menard et al., U.S. Pat. No. 6,176,288 to Kane et al., U.S. Pat. No. 6,119,514 to Piacente et al, U.S. Pat. No. 6,082,191 to Neiferd et al., U.S. Pat. No. 4,947,919 to Timlin, and U.S. Pat. No. 4,886,101 to Kinnick et al. describe assembly lines and machines for mounting or assembling tires on their rims. The U.S. Pat. No. 6,199,270 to Menard et al. discloses an assembly line for mounting tires on wheels including several stations designated for inflating the tire mounted on the wheel, placement of the bead heels of the tire, and balancing the tire, which also includes apparatus for checking the conformity of the diameter of the tire to be mounted and for checking the conformity of the dimensions of the wheel.

The U.S. Pat. No. 6,082,191 to Neiferd et al. illustrates an inlet conveyor for conveying tires through a tire uniformity testing system. The conveyor includes a tire centering mechanism and a pair of conveyor belts for delivering tires to a tire testing station. A conveyor elevator may be raised or lowered with respect to the frame unit to raise or lower the support rails and conveyor belts. The support rails and conveyor belts are adjustable in a lateral direction to vary the width of the space between the belts to accommodate different size tires. The conveyor is movable with respect to the testing station to reverse the direction of tire flow through the testing machine. The U.S. Pat. No. 6,082,191 to Neiferd et al. does not teach a method of the assembly line expansion, wherein the assembly line may be easily re-configured or re-shaped thereby adding an extra filler section or unit.

In addition to the patents, cited above, the U.S. Pat. No. 4,789,015 to Flinn discloses an apparatus for assuring that an uninflated mini tire mounted on a wheel is coaxially centered relative to the wheel prior to the arrival of the mini tire-wheel unit at the inflation station of a tire-wheel assembly line. The assembly line includes a pallet type conveyor comprising a plurality of pallets, which are advanced from left to right of the assembly line. The assembly line includes a tire mounter station and a tire inflater station. Similar to the U.S. Pat. No. 6,082,191 to Neiferd et al., the U.S. Pat. No. 4,789,015 to Flinn does not teach a method of the assembly line expansion, wherein the assembly line maybe easily re-configured or re-shaped thereby adding an extra section or unit.

Although the prior art assembly lines including wheel orienting, wheel/tire soaping, tire mounting, and inflating units are used by a wide variety of manufacturers in the automotive industry, one of the areas of continuous development and research is the area of a more advanced design of the assembly line wherein the line is adapted to conform with different floor configurations in an assembly plant or factory. The opportunity remains for a new design of the assembly line, where, unlike typical assembly lines, used in the automotive industry today, the assembly line may be expanded, and easily re-configured or re-shaped, wherein a variety of work stations may be inserted into the assembly line to satisfy different requirements of the manufacturers.

SUMMARY OF INVENTION

The present invention provides an assembly line for mounting tires to wheels and includes a plurality of modules that are removably connected to one another. An endless conveyor member is supported for movement by the plurality of modules and can move wheels and tires between work stations. A wheel soaper work station is positioned at one end of the assembly line to soap wheels prior to assembly. A tire soaper work station is disposed along the assembly line to soap tires before assembly. A transfer device receives the tires from the tire soaper work station and transfers the tires to the endless conveyor member to be engaged with a corresponding, soaped wheel. The tire and wheel move along the assembly line to a wheel assembly work station and then to a tire inflation station. The inflated tire and wheel assembly is moved to a pressure sensor work station and the pressure of the tire is measured before the tire and wheel assembly is removed from the assembly line.

One of the advantages of the present invention is that the length of the assembly line can be changed as desired by adding or removing modules. The modules are interconnected with bolts or any other removable fastener. The modules are interchangeable and can be moved from one position along the assembly line to another position along the assembly line.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE INVENTION

Figure 1:
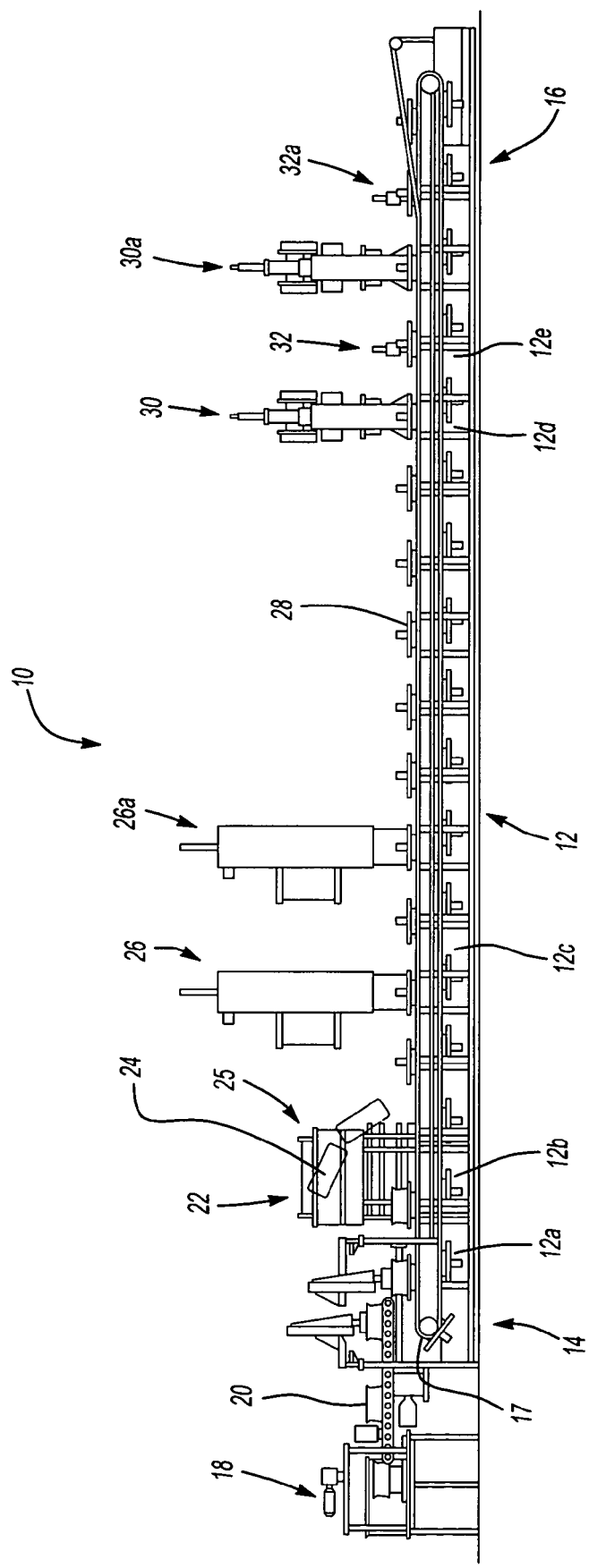
FIG. 1 is a left-hand side view of an assembly line according to the exemplary embodiment of the invention.

Referring now to FIG. 1, the present invention provides an assembly line 10 having a plurality of modules 12. The modules 12 are releasably interconnected with respect to one another and define the beginning 14 and ending 16 of the assembly line 10. The length of the assembly line 10 is defined between the beginning 14 and the end 16. The assembly line 10 includes an endless conveyor member 17 defining a closed loop for moving wheels and tires along the length of the assembly line 10. The endless conveyor member 17 is supported for circling movement by the plurality of modules 12. The endless conveyor member 17 is preferably a chain-type member. However, other types of conveyors may be used as is known to those of skill in the art.

The assembly line 10 also includes a wheel soaper work station 18 for soaping wheels 20. The wheel soaper work station 18 is positioned adjacent a first module 12a. Soaped wheels 20 are moved to the endless conveyor member 17 at the first module 12a. The assembly line 10 also includes a tire soaper workstation 22 for soaping tires 24 to be moved to the endless conveyor member 17. The tire soaper work station 22 is disposed along the length of the assembly line 10 adjacent a second module 12b. The modules 12a and 12b can be exchanged if desired. Preferably, all of the modules have the same dimensions and are completely interchangeable.

A transfer device 25 is positioned to receive soaped tires 24 from the tire soaper work station 22 and transfer the soap tires 24 to the endless conveyor member 17. The soaped tires 24 are positioned on the soaped wheels 20 and moved to one of a plurality of wheel assembly work stations 26, 26a. The wheel assembly work stations 26, 26a are disposed along the conveyor member 17 adjacent a third module 12c. The wheels 20 and tires 24 are moved to the wheel assembly work stations 26, 26a with a carriage 28. The assembly line 10 includes a plurality of carriages 28 for moving a plurality of wheels 20 and tires 24 at one time. The carriages 28 are moved between the beginning 14 and end 16 by the conveyor member 17. The module 12c is exchangeable with the modules 12a or 12b if desired.

The assembled wheels and tires 20, 24 are moved along the assembly line 10 by the endless conveyor member 17 to one of a plurality of tire inflation work stations 30, 30a. The tire inflation work stations 30, 30a are disposed along the endless conveyor member 17 substantially adjacent a fourth module 12d. The inflated tires 24 are moved to one of a plurality of pressure sensor work stations 32, 32a to confirm that the tires 24 are properly inflated. The air pressure sensor work station 32 is disposed along the endless conveyor 17 substantially adjacent a fifth module 12e. The modules 12d, 12e are exchangeable with any of the modules 12a, 12b, 12c, if desired. After the tires 24 and wheels 20 are assembled with respect to one another and the tires 24 are inflated, the assembled wheels and tires 20, 24 are removed from the end 16 of the assembly line 10.

Referring now to FIGS. 2-4a, each module 12 includes a lower frame assembly 34 and an upper frame assembly 36. The lower frame assembly 34 includes first and second upper longitudinal horizontal cross members 38, 40 extending parallel to the conveyor member 17. The lower frame assembly 34 also includes first and second lower longitudinal horizontal cross members 40, 42 extending parallel to the conveyor member 17. The lower member 17. The lower frame assembly 34 also includes first and second lower longitudinal horizontal cross members 40, 42 extending parallel to the conveyor member 17. The lower frame assembly 34 also includes first and second downstream vertical cross members 46, 48. The lower frame assembly 34 also includes first and second upstream vertical cross members 50, 52. The horizontal cross members 38, 40, 42, 44 and the vertical cross members 46, 48, 50, 52 are rigidly associated with respect to one another to form a cube-like structure. The cross members 38, 40, 42, 44, 46, 48, 50, 52 are releasably connected to one another, such as being bolted together, or can be fixedly connected to one another, such as being welded together. First and second lower plate members 54, 56 extend transverse to the conveyor member 17 at opposite ends of the module 12. The lower plate members 54, 56 define apertures for receiving leveling bolts 58.

The lower frame assembly 34 also includes a plurality of engagement plates 60, 60a, 60b, 60c disposed at the four corners of the lower frame assembly 34. Each of the engagement plates 60-60c define apertures, such as apertures 62, 62a, for receiving bolts to interconnect one module to another. For example, an engagement plate 60b of a first module is positioned adjacent an engagement plate 60 of a second module and bolts are inserted through the aligned apertures of the engagement plates 60b and 60 to interconnect adjacent modules with respect to one another. Likewise, an engagement plate 60c is aligned with and connected to an engagement plate 60a. A plate member 64 is disposed over the longitudinal horizontal cross members 38, 40. The upper frame assembly 36 is bolted to the plate member 64 of the lower frame assembly 34.

The upper frame assembly 36 includes a first sidewall 66 and a second sidewall 68. The upper frame assembly 36 defines an open top 70 and a bottom 72 closed by the plate member 64. Aligning tracks 74, 74a are bolted to the first and second sidewalls 66, 68, respectively. Each aligning track includes a top plate 76, a bottom plate 78, and a spacer 80 disposed between the top plate 76 and the bottom plate 78. The aligning tracks 74, 74a guide movement of the carriage 28 through the module 12 in the direction of the end 16 of the assembly line 10.

Figure 2:
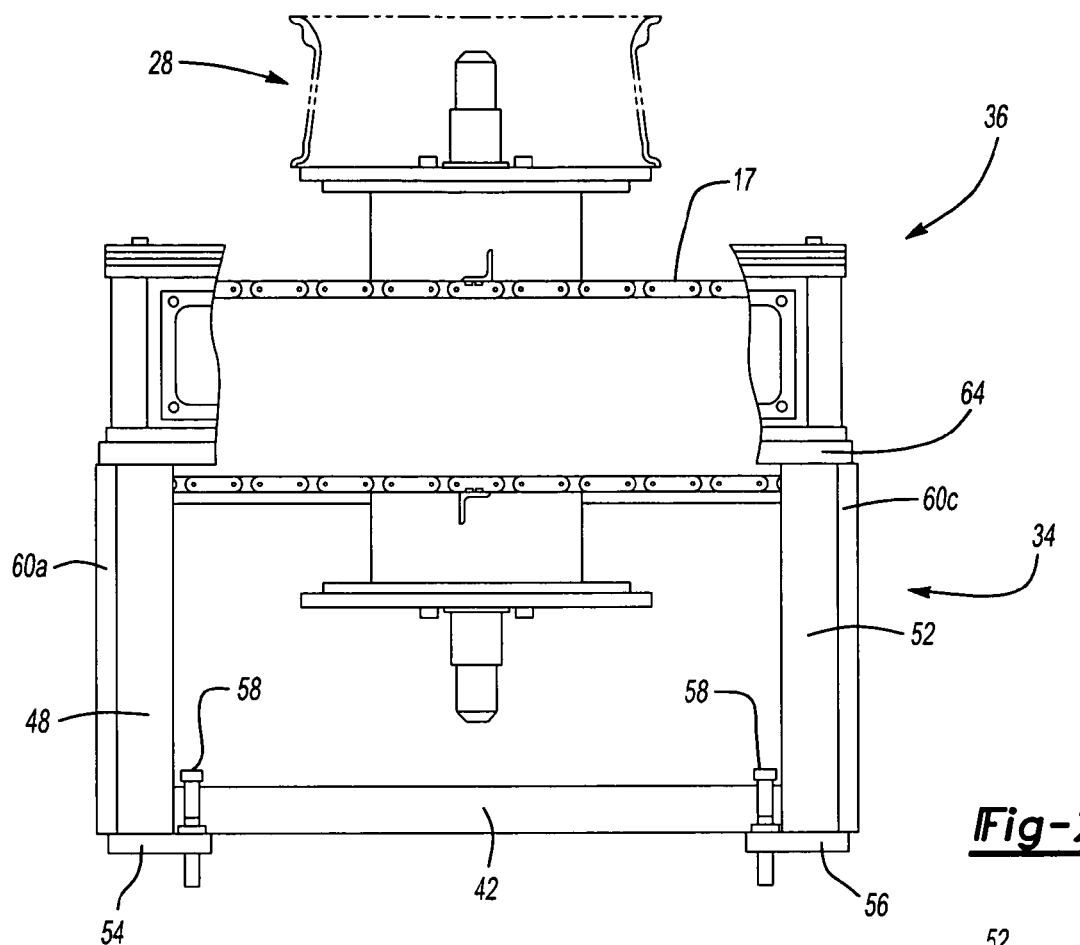
FIG. 2 is a side view of a module according to the exemplary embodiment of the invention.
Figure 3:
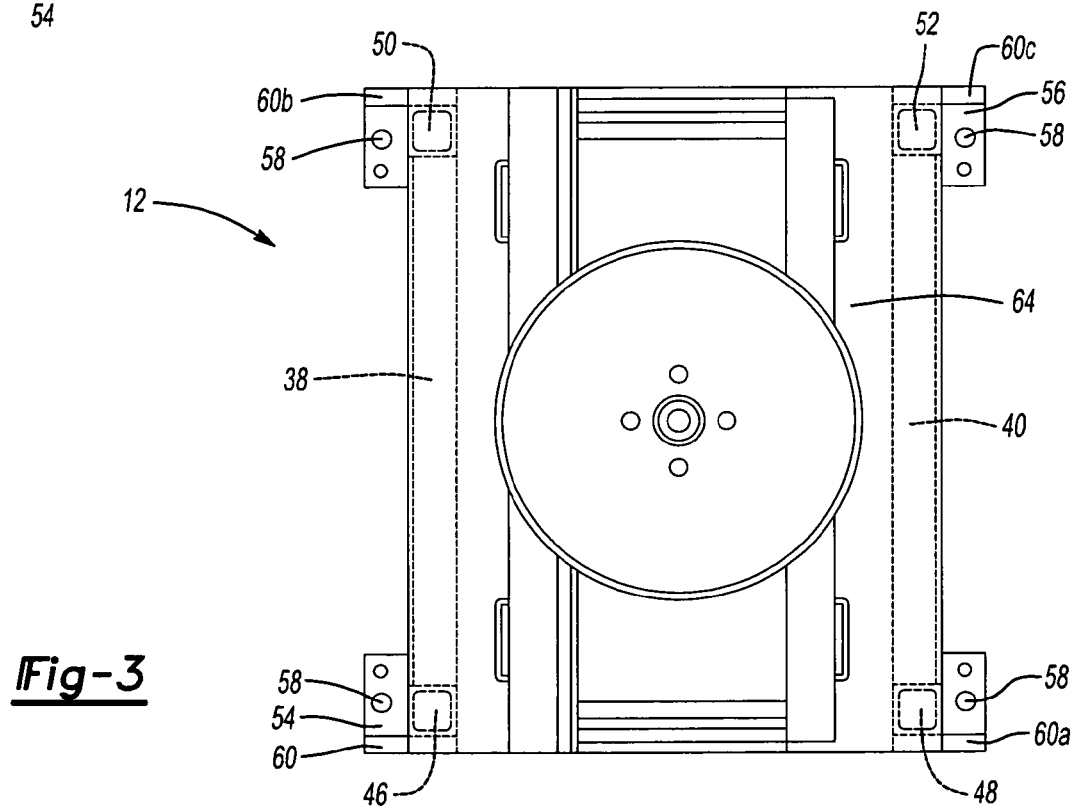
FIG. 3 is a top view of the module shown in FIG. 2.
Figure 4:
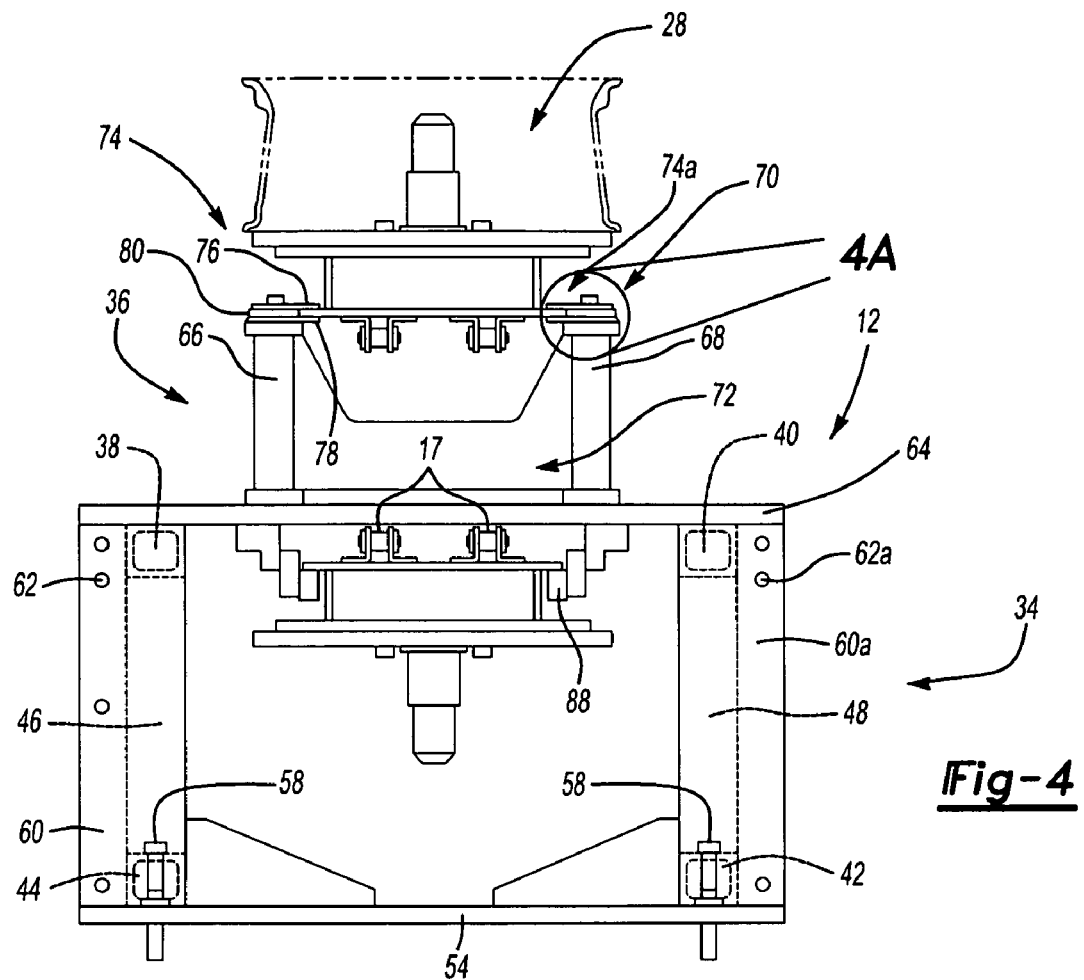
FIG. 4 is a front view of the module shown in FIGS. 2 and 3.
Figure 4A:
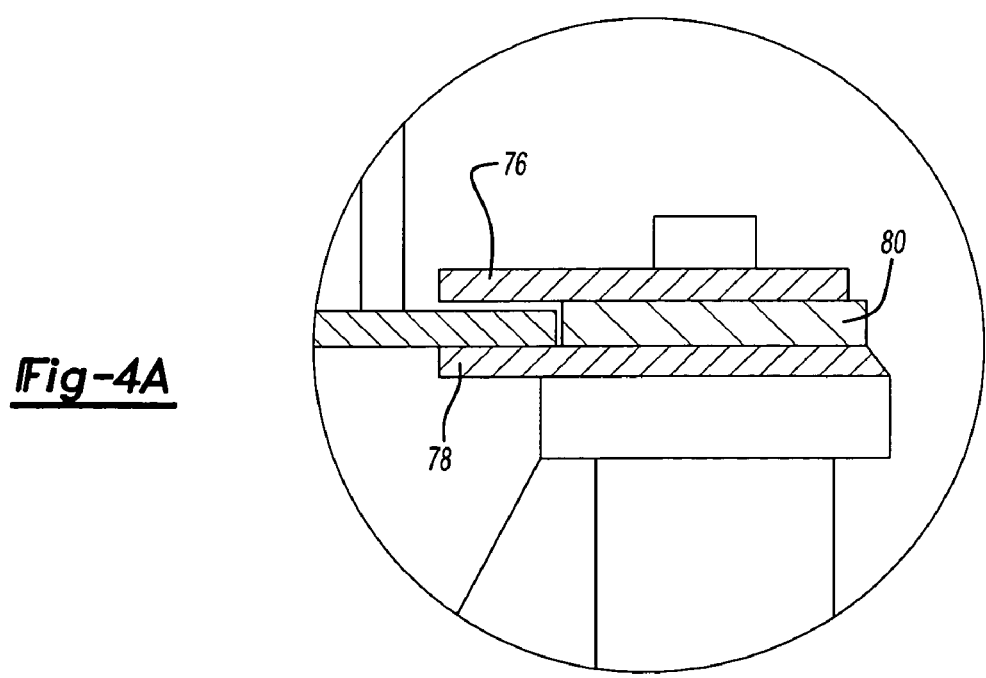
FIG. 4a is a detailed view of the tracks for supporting movement of carriages through the modules.

Referring now to FIG. 2, the carriages 28 are moved through the module 12 by conveyor member 17. The member 17 includes two chains supported for circulating movement by the module 12. The member 17 is immovably associated with each carriage 28 and pulls each carriage 28 through the aligning tracks 74, 74a toward the end of the assembly line.

Figure 5:
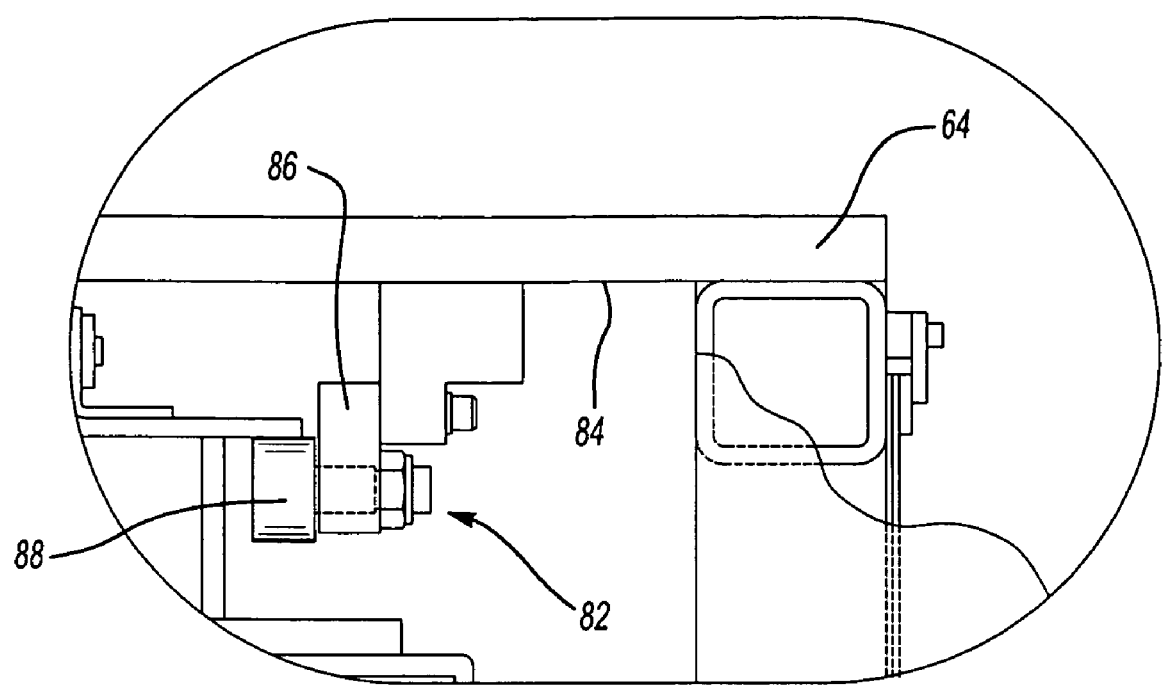
FIG. 5 is a magnified view of the supporting mechanism for supporting movement of carriages along the assembly line.

Referring now to FIG. 5, supporting mechanisms 82 extend from a downwardly facing surface 84 of the plate member 64 to support the carriages 28 during movement toward the beginning 14 of the assembly line 10. Each supporting mechanism 82 includes an adjustable arm 86 for supporting a roller 88. The arm 86 can be adjusted to accommodate different sized carriages moving along the assembly line 10.

Obviously, many modifications and variations of the present invention are possible in light of the above teachings. The invention may be practiced otherwise than as specifically described within the scope of the appended claims. These antecedent recitations should be interpreted to cover any combination in which the incentive novelty exercises its utility. In addition, the reference numerals in the claims are merely for convenience and are not to be read in any way as limiting.

What is claimed is:

1. An apparatus for assembling tires and wheels with respect to one another comprising:
    a plurality of modules removably interconnected with one another to form an assembly line with at least one of said modules being configured to perform an operation different than other of said modules; and
    an endless conveyor member for moving wheels along said assembly line and supported for circling movement along said length by said plurality of modules.

2. The apparatus of claim 1 wherein said plurality of modules are identical with respect to one another.

3. The apparatus of claim 1 wherein each of said plurality of modules is exchangeable with any other of said plurality of modules.

4. The apparatus of claim 1 wherein each of said plurality of modules includes an upper frame assembly and a lower frame assembly.

5. The apparatus of claim 4 wherein said upper frame assembly is mounted on said lower frame assembly.

6. The apparatus of claim 4 further comprising:
    a plurality of carriages movable along said plurality of modules with said endless conveyor member, wherein each of said plurality of modules includes first and second aligning tracks associated with said upper frame assembly for guiding movement of said carriages through said plurality of modules in a first direction.

7. The apparatus of claim 6 wherein each of said plurality of modules further comprises supporting mechanisms for supporting movement of said carriages through said plurality of modules in a second direction.

8. An apparatus for assembling tires and wheel with respect to one another comprising:
    a plurality of modules and workstations removably interconnected with one another to form an assembly line with said workstations dispersed between said modules for assembling the tires to the wheels; and
    a continuous conveyor member for moving the wheels and the tires along said assembly line, wherein said continuous conveyor member defines a closed loop resting upon at least said modules while transporting the tires in a first direction and supported by said modules while moving in a return direction.

9. The apparatus of claim 8 wherein said continuous conveyor member is a chain.

10. The apparatus of claim 8 wherein said plurality of workstations include a tire soaping station, a wheel soaping station and a wheel assembly workstation for assembling individual the soaped tires and individual the soaped wheels with respect to one another.

11. The apparatus of claim 8 wherein said plurality of workstations include at least two wheel assembly workstations for assembling individual the soaped tires and individual the soaped wheels with respect to one another.

12. The apparatus of claim 8 further comprising:
    a plurality of carriages movable along said plurality of modules with said continuous conveyor member, wherein each of said plurality of modules includes first and second aligning tracks associated with said upper frame assembly for guiding movement of said carriages through said plurality of modules in a first direction.

13. The apparatus of claim 12 wherein each of said plurality of modules further comprises supporting mechanisms for supporting movement of said carriages through said plurality of modules in a second direction.

14. An apparatus for assembling tires and wheel with respect to one another comprising:
    a plurality of modules removably interconnected with one another to form an assembly line;
    an endless conveyor member for moving wheels along said assembly line and supported for circling movement along said length by said plurality of modules;
    a wheel soaper workstation for soaping wheels moved along said assembly line by said endless conveyor member and disposed along said assembly line adjacent a first module of said plurality of modules;
    a tire soaper workstation for soaping tires to be moved to said endless conveyor member and disposed along said assembly line adjacent a second module of said plurality of modules;
    a transfer device for receiving soaped tires from said tire soaper workstation and transferring said soaped tires to said endless conveyor member downstream of said wheel soaper and disposed along said assembly line adjacent a third module of said plurality of modules;
    a wheel assembly workstation for assembling individual said soaped tires and individual said soaped wheels with respect to one another, said wheel assembly workstation disposed along said assembly line adjacent a fourth module of said plurality of modules, downstream of said wheel soaper workstation and said transfer device; and
    a tire inflation workstation disposed along said assembly line adjacent a fifth module of said plurality of modules, downstream of said wheel assembly workstation; and
    said plurality of modules and workstations being removably interconnected with one another to form said assembly line with said workstations being dispersed between said modules for assembling the tires to the wheels.

* * * * *